United States Patent [19]

Fuke et al.

[11] Patent Number: 4,700,251
[45] Date of Patent: Oct. 13, 1987

[54] HEAD CARRIAGE MOVING MECHANISM OF DISK RECORDING REPRODUCING DEVICE

[75] Inventors: Takamichi Fuke; Chiaki Aikawa; Takashi Watanabe, all of Furukawa; Yuichi Hishi, Miyagi, all of Japan

[73] Assignee: Alps Electric Co., Ltd., Japan

[21] Appl. No.: 746,390

[22] Filed: Jun. 19, 1985

[30] Foreign Application Priority Data

Jun. 19, 1984 [JP] Japan ................... 59-90257

[51] Int. Cl.⁴ .................. G11B 5/55; G11B 21/08
[52] U.S. Cl. .................. 360/106; 74/89.15; 360/109
[58] Field of Search ......... 360/106, 109, 105, 75, 360/107, 97, 99; 74/458, 89.15

[56] References Cited

U.S. PATENT DOCUMENTS

| | | | |
|---|---|---|---|
| 4,096,537 | 6/1978 | Butsh | 360/106 |
| 4,131,923 | 12/1978 | Wachs et al. | 360/106 |
| 4,383,283 | 5/1983 | Machut | 360/97 |
| 4,422,113 | 12/1983 | Mabon | 360/78 |
| 4,524,400 | 6/1985 | Cantwell | 360/106 |

FOREIGN PATENT DOCUMENTS 2147728 5/1985 United Kingdom ............... 360/106

*Primary Examiner*—Stuart N. Hecker
*Assistant Examiner*—David J. Severin
*Attorney, Agent, or Firm*—Guy W. Shoup

[57] ABSTRACT

A disk recording-reproducing device having a carriage with a read/write head, a screw shaft to shift the carriage with an engaging element through coupling between a spiral groove of the screw shaft and the engaging element, and a stepping motor to rotate the screw shaft. The spiral groove is composed of a number of groove portions each with a straight bottom whose angle of lead is substantially zero degree that are displaced successively, circumferentially and axially. Preferably, the screw shaft has plane portions for its positioning, and a rotor of the stepping motor has magnetization points being set correspondingly to the lines of the groove portions.

4 Claims, 10 Drawing Figures

HEAD CARRIAGE MOVING MECHANISM OF DISK RECORDING REPRODUCING DEVICE

BACKGROUND OF THE INVENTION

1. Field of the Invention

This invention relates to a recording-reproducing device for a magnetic disk used as a recordable terminal device of computer, word processor and the like.

2. Description of the Prior Art

Hitherto, the conventional intermittent feed mechanism for shifting a carriage having a magnetic head mounted thereon in the radial direction of a magnetic disk had employed the so-called steel belt system in many cases, but this steel belt system had the drawbacks that setting of the belt and adjusting of its tension are troublesome and the factor of space utilization is bad. Recently, instead of the above, a carriage shifting mechanism based on the screw shaft system is going to be employed in the disk recording-reproducing device, for such a reason that it is suitable for decreasing a device size.

FIG. 9 is a plane view illustrating the conventional carriage shifting mechanism of the screw shaft system as noted above. In this drawing, 1 is a stepping motor mounted on a chassis 2, and 3 is a screw shaft formed on its outer periphery with a spiral groove 3a, which passes through a permanent magnet (not shown) of a cylinder shape, that is a rotor of the stepping motor 1, and is locked thereto, one end of the screw shaft being supported by a bearing (not shown) of a casing of the stepping motor 1 and the other end being supported by a bearing 4. 5 is a carriage with a read/write magnetic head 6 mounted thereon, which is shifted along two guide shafts 7, 8. 9 is an engaging element attached to the carriage 5 whose point 9a of a cone shape is engaged with the spiral groove 3a of the screw shaft 3.

In the foregoing structure, as the screw shaft 3 is rotated in the forward/reverse directions by the stepping motor 1, the point 9a fitted in the spiral groove 3a moves in the arrow directions shown in the drawing and, as a result, the carriage 5 is shifted reciprocatingly along the guide shafts 7, 8 a distance corresponding to the degree of rotation of the screw shaft 3.

Specifically, the spiral groove 3a of the screw shaft 3 in the foregoing structure has the same angle of lead $\theta$ over the whole periphery and exhibits a straight line when developed, as illustrated in FIG. 10. Accordingly, if the system is designed so that movement of the carriage 5 is stopped intermittently at eight points, for example, corresponding to the turning angles 0°, 45°, 90°, 135°, 180°, 225°, 270°, 315° of the screw shaft 3, the carriage 5 shows a minute discrepancy in its positioning as the results of inertia of the carriage 5, influence of damped oscillation of, variation in rotation control of the stepping motor 1, and the like. Thus, the conventional device had the drawback that some difficulty is easy to occur in performing accurate read/write operation of the magnetic head 6 in relation to a magnetic track on the disk.

SUMMARY OF THE INVENTION

The present invention has been devised in view of the foregoing problems, and its object is to provide a disk recording-reproducing device which achieves accurate shifting and positioning in stoppage of a carriage.

In order to achieve the foregoing object, a disk recording-reproducing device of the present invention resides in the type in that an engaging element of a carriage having a read/write magnetic head mounted thereon is engaged with a spiral groove of a screw shaft, and the carriage is shifted straightly a given distance in response to rotation of the screw shaft caused by means of the driving force of a stepping motor, and is characterized in that the screw shaft is rotated in unison with a rotor made up of a permanent magnet of the stepping motor, in the outer periphery of the screw shaft there are formed a number of groove portions each having a straight bottom whose angle of lead is substantially zero degree that are displaced successively in the circumferential direction and in the axial direction to create one spiral groove. The grooves are circumferentially offset at equal angular spacings, and the screw shaft has a polygonal portion provided with planar faces which provide a machining or rotational reference corresponding to the grooves and to the magnetic poles of the stepping motor driving the screw shaft in incremental rotation.

BRIEF DESCRIPTION OF THE DRAWINGS

FIGS. 1 through 8 concern one embodiment of the present invention in which

FIG. 1 is an explanatory view illustrating a carriage shifting mechanism;

FIG. 2 is a front view of a cutter;

FIG. 3 is a side view of the cutter;

FIG. 4 is an enlarged front view of a screw shaft;

FIG. 5 is a side view of the screw shaft;

FIG. 6 is an explanatory view illustrating the relation between groove portions of the screw shaft and a permanent magnet;

FIG. 7 is a schematic structural diagram of a magnetizer; and

FIG. 8 is an explanatory graph illustrating the relation between the angle of rotation of the screw shaft and the shifted distance of the carriage;

FIGS. 9 and 10 concern the conventional device in which

FIG. 9 is an explanatory view of the carriage shifting mechanism; and

FIG. 10 is an explanatory graph illustrating the relation between the angle of rotation of the screw shaft and the shifted distance of the carriage.

DESCRIPTION OF THE PREFERRED EMBODIMENT

The present invention will be described with reference to its embodiment shown in FIGS. 1 through 8.

Figure 1:
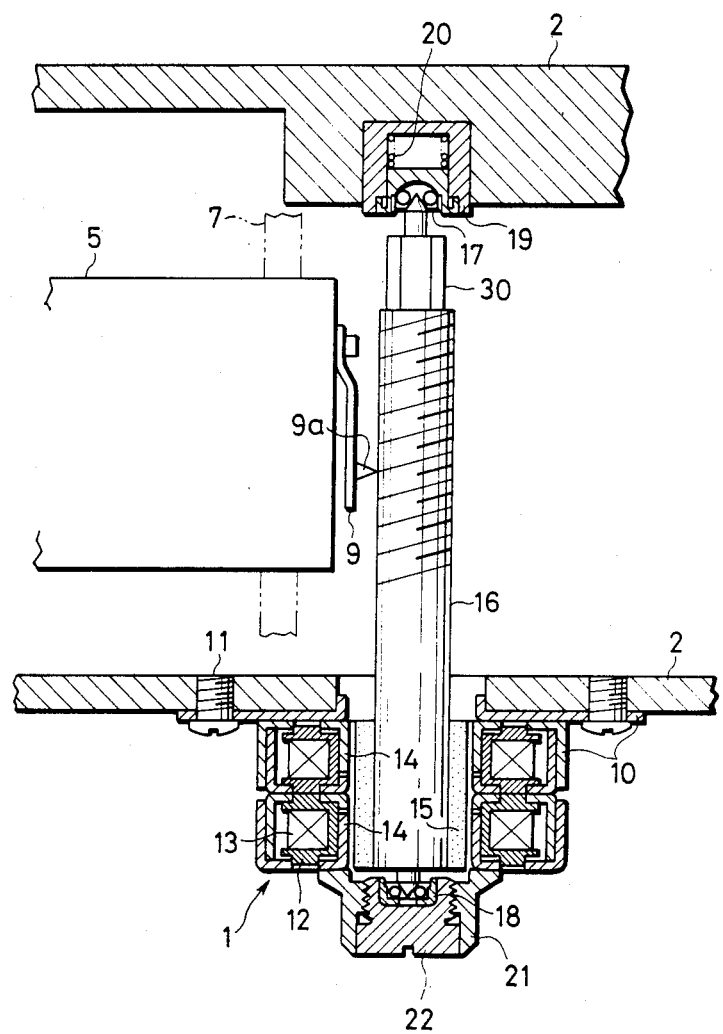
Figure 9:
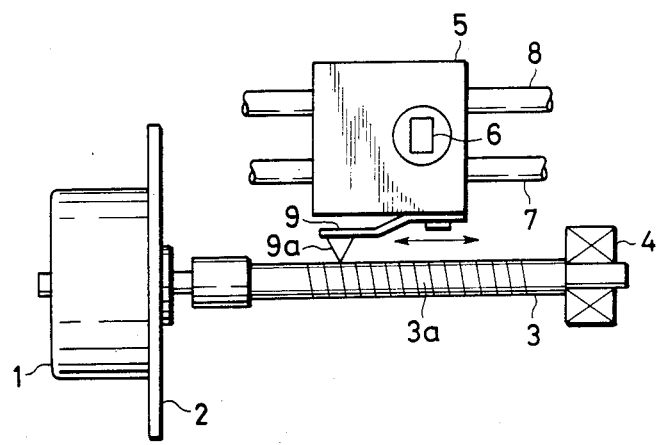
Figure 10:
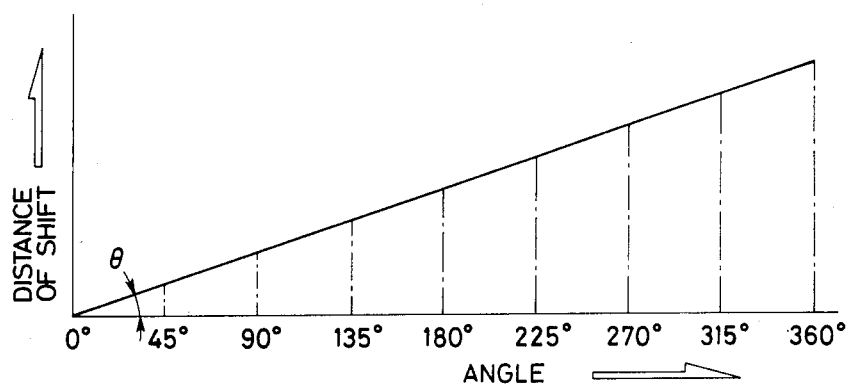

FIG. 1 is a plane view of a carriage shifting mechanism with a portion cut off, in which the elements similar to or equal to those of the structure shown in FIG. 9 bear the same symbols as those. The stepping motor 1 is secured to the chassis 2 of the device body by screws 11 via its casing 10. Inside the casing 10 there are provided coils 13 wound round coil bobbins 12 and a comb-like yoke 14 formed integrally with the casing 10, these elements composing a stator of the motor, a ring-like permanent magnet 15 composing a rotor. The permanent magnet 15 is secured on a screw shaft 16, and conical tips of small diameter on either end of the screw shaft 16 are supported rotatably by ball bearings 17, 18. The bearing 17 is held as not coming off by the chassis 2 via a holding member 19 and urged always toward the screw shaft 16 by a spring 20 stored inside the holding member 19, so that the screw shaft 16 is always pushed elastically toward the bearing 18. The bearing 18 is secured on an adjust screw 22 screwed into a supporting member 21 attached to the stepping motor 1, so that by turning the adjust screw 22 the position of the screw shaft 16 can be adjusted minutely in the thrust direction.

Figure 2:
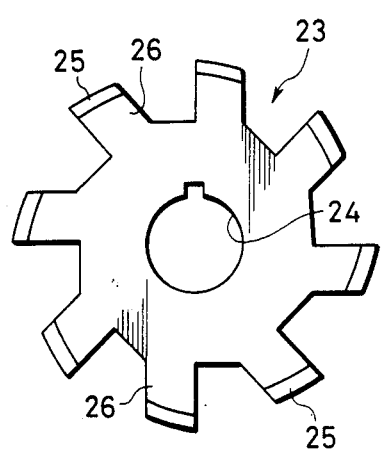
Figure 3:
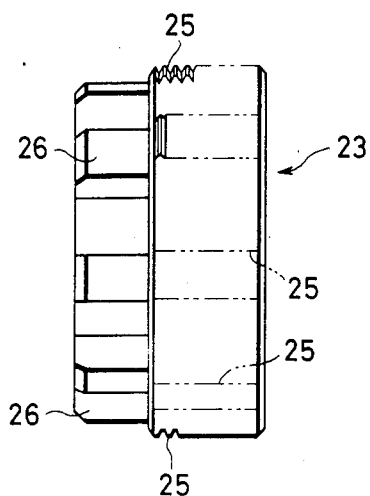

FIG. 2 is a front view of a cutter 23 used to machine the screw shaft 16, and FIG. 3 is a side view of the cutter 23. The cutter 23 has in its center a mounting bore 24 with a key way and is provided on its outer periphery with a number of blade portions 25 and blade portions 26.

The blade portions 25 are designed so that the n pieces are distributed circumferentially and this circumferential group is arranged many times successively along the axis. That is, adjacent blade portions 25 are displaced one from another $2\pi/n$ radian circumferentially and 1/n pitch axially. In the present embodiment, the group of eight blade portions 25 arranged circumferentially and spaced evenly one from another 45 degrees ($2\pi/8$ radian) is provided 12 times or columns in the axial direction with successive adjacent groups being displaced one from another ⅛ pitch, as an example. On the other hand, the blade portions 26 are formed and extended relatively long in the axial direction and the n pieces are distributed circumferentially at an equal spacing. In the present embodiment, the eight blade portions 26 are spaced one from another 45 degrees so as to accord in phase with the former blade portions 25.

When the cutter 23 and a workpiece (not shown) of a cylinder shape are rotated in the same direction under the ratio of rotation being 1:1 and the cutter 23 is shifted a given distance toward the rotary shaft of the workpiece, the locus of contact point between the cutter 23 and the workpiece becomes a straight line and the workpiece is cut by the blade portions 25, 26. Accordingly, in the outer periphery of the workpiece there is formed a spiral groove created by the blade portions 25 and a polygonal prism section by the blade portions 26, thereby resulting in the foregoing screw shaft 16.

Figure 4:
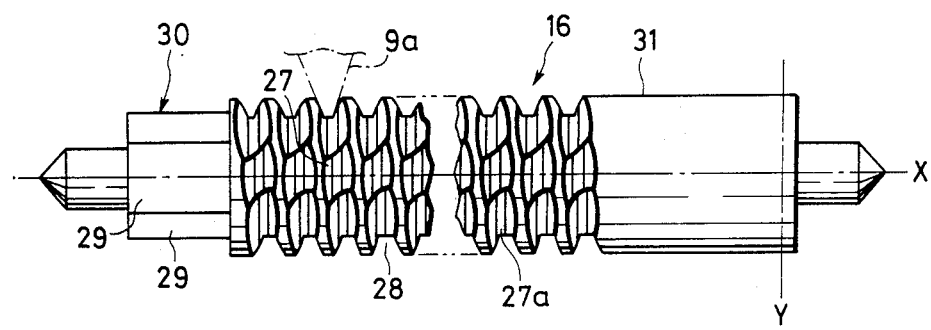
Figure 5:
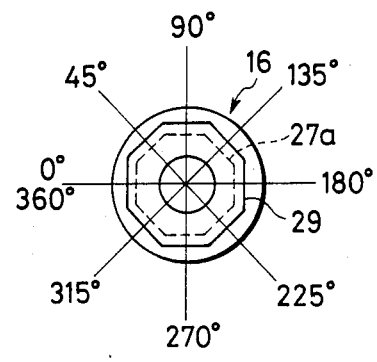

FIG. 4 is an enlarged front view of the thus machined screw shaft 16, and FIG. 5 is a side view of this screw shaft 16. As shown in these drawings, in the outer periphery of the screw shaft 16 there are formed by the blade portions 25 the eight groove portions 27 as one column separated one from another circumferentially at an equal spacing, whose each bottom 27a is of a straight line and its angle of lead $\theta_1$ is zero degree, i.e., its direction is parallel to the perpendicular line Y intersecting orthogonally the axial line X, these groove portions being spaced one from another ⅛ pitch in the axial direction. Thus, plural columns of these groove portions 27 create one spiral groove 28. Sideways the spiral groove 28 there is formed by the blade portions 26 a polygonal prism section 30 composed of eight plane portions 29. These plane portions 29 are displaced circumferentially one from another at an equal spacing or the angle of 45 degrees, and, as shown in FIG. 5, the plane portions 29 and the bottoms 27a of the groove portions 27 are formed and arranged so that they are mutually parallel, i.e., their phases coincide with each other.

Figure 6:
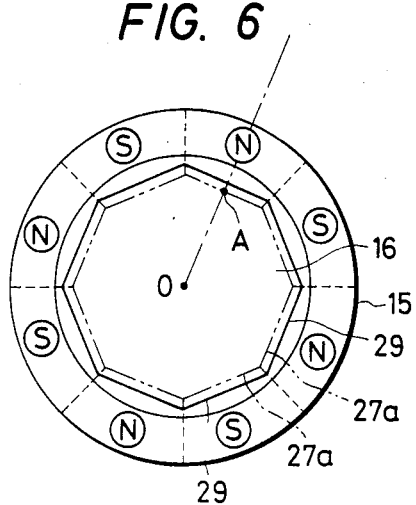

The permanent magnet 15 is secured to a circular cylinder portion 31 formed at one end of the screw shaft 16, and this permanent magnet 15 is magnetized by a magnetizer hereinafter described in such a way that, as shown in FIG. 6, N poles and S poles are created alternatingly through magnetization and each magnetization point of N, S poles is set as to position on the straight line joining the axial center 0 of the screw shaft 16 with the central point A of the bottom 27a of each groove portion 27.

Figure 7:
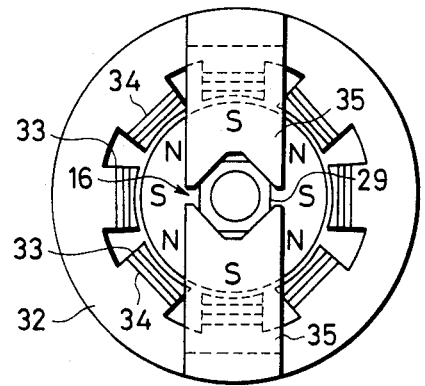
Figure 8:
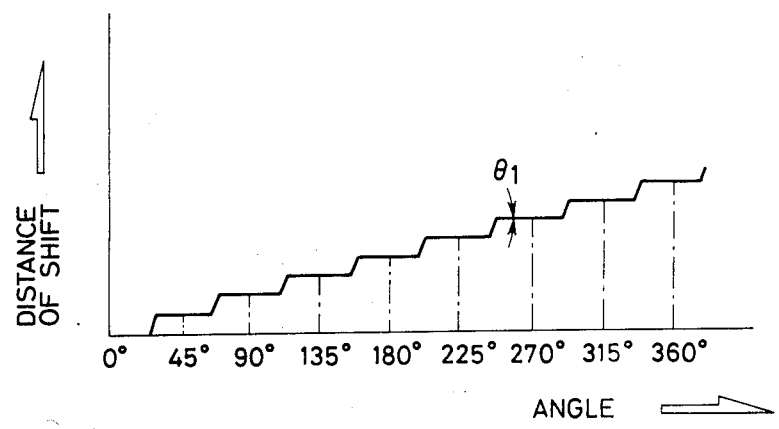

FIG. 7 is a schematic structural diagram for explanation of such magnetization operation. In this drawing, 32 is the magnetizer, from the inner peripheral surface of which eight cores 33 are projecting at an equal spacing, and round each core 33 a coil 34 is wound with its winding direction being opposite to that of adjacent coils or reversed alternatingly. In magnetizing the permanent magnet 15, material of the permanent magnet prepared by mixing rare earth cobalt or ferrite with resin such as nylon at a volume ratio of 2:1 is insert-molded around the circular cylinder portion 31 of the screw shaft 16, then, this permanent magnet material is inserted inside the respective cores 33 of the foregoing magnetizer 32, and the plane portions 29 of the polygonal prism section 30 are chucked by a pair of hold-down tools 35 so that the screw shaft 16 may be held at a given angle or orientation. Thereafter, a current of some ten thousand amperes is forced to flow through each coil 34 for some hundred seconds to magnetize the permanent magnet material portions facing the respective cores 33 so that they exhibit the N, S poles alternatingly. In this process, because the plane portions 29 coinciding in phase with the bottoms 27a of the groove portions 27 are chucked by the hold-down tools 35, the screw shaft 16 is positioned at a given orientation in relation to the magnetizer 32, thus, each magnetization point can be set in a given location, i.e., on the straight line joining the axial center 0 of the screw shaft 16 with the central point A of the bottom 27a of each groove portion 27. Angular positions of rotation stoppage of the stepping motor 1 are those where each magnetization point of the permanent magnet 15 opposes to each yoke 14 and stops, and in the present embodiment, the respective angles of rotation stoppage of the stepping motor 1 are set as to correspond to eight locations relating to the degree of rotation 0°, 45°, 90°, 135°, 180°, 225°, 270°, 315° of the screw shaft 16. Accordingly, as the stepping motor 1 is rotated by a desired number of steps and caused to stop at one of the foregoing angles of stoppage, the engaging element 9, or the carriage 5, is shifted a distance corresponding to the extent of rotation of the screw shaft 16 and stops at a desired location. At this moment, because the point 9a of the engaging element 9 positions in the center of one groove portion 27 at respective stop positions and each stop point is the center of each groove portion 27, as indicated by the alternate long and short dash line in FIG. 8, whose angle of lead $\theta_1$ is 0°, each positioning is always accurate.

In the present embodiment of the foregoing structure, because, when to create the permanent magnet 15 through magnetization, the screw shaft 16 can be chucked at the plane portions 29 not relating to driving of the carriage 5, magnetization can be achieved at the accurate locations without damaging the groove portions 27 in which the engaging element 9 fits.

Since the plane portions 29 are formed correspondingly to all groove portions 27 in the circumferential direction of the spiral groove 28 to result in the polygonal prism shape, the polygonal prism section 30 made up of the respective plane portions 29 may be utilized as a rotation position detecting mechanism for the screw shaft 16. That is, by providing an optical reflection sensor as to face the polygonal prism section 30, applying light to the plane portions 29 from the optical reflection sensor, and receiving again light by the optical reflection sensor, it is possible to get the number of pulses corresponding to the extent of rotation of the stepping motor 1. Thus, the stop position of the carriage 5 can be controlled on the basis of the output of the optical reflection sensor, meaning the reception of light or the position of the stepping motor 1.

Since the carriage 5 can be adjusted as to take a certain position (a reference track position) by turning the adjust screw 22 with the polygonal prism section 30 being chucked by the hold-down tools, the work of adjusting minutely the position of the carriage 5, that is required in the assembling process, can be automated.

Though in the foregoing embodiment the plane portions 29 are formed correspondingly to all groove portions 27 in the circumferential direction of the spiral groove 28 to give the polygonal prism section, the number of these plane portions 29 is not necessary to be limited to that of the embodiment, but sufficient if there is at least one. That is, the screw shaft 16 can be chucked at a given position or orientation by taking one plane portion 29 as a reference. Also, the engaging element 9 is not necessary to be limited to that indicated in the present embodiment, it may be of the center crank type instead of the cantilever type, for example.

As apparent from the foregoing description, according to the present invention, by chucking the screw shaft through utilization of the plane portions, the magnetization points of the permanent magnet can be set accurately to the center portion of each groove portion of the screw shaft, as a result, the stop position of the engaging element fitting in the groove portions is controlled accurately in the center of each groove portion whose angle of lead is substantially 0°, and the accurate shifting and positioning of the carriage can be realized.

While the preferred embodiment has been described, variations thereto will occur to those skilled in the art within the scope of the present inventive concepts which are delineated by the following claims.

What is claimed is:

1. A head carriage moving mechanism for a disk recording/reproducing device of the type having a read/write magnetic head mounted on a carriage which is movable along an axial direction, an engaging element fixed to the carriage, a screw shaft having a spiral groove in which the engaging element is engaged for incrementally moving the carriage in the axial direction upon rotation of the screw shaft by a stepping motor, wherein the improvement comprises:

said spiral groove of said screw shaft being formed with successive linear groove portions which are offset circumferentially at equal angular spacings around the outer periphery of said screw shaft, which have a zero degree angle of lead, and which are offset incrementally in the axial direction;

said screw shaft being rotated in unison with a rotor of said stepping motor composed of a permanent magnet having a plurality of magnetic poles which are arranged corresponding to the circumferential angular spacings of said groove portions; and said screw shaft having formed thereon a portion having a polygonal prism shape wherein the planar faces thereof are distributed circumferentially around said screw shaft in correspondence to the angular spacings of said groove portions and said magnetic poles.

2. A disk recording-reproducing device as set forth in claim 1, including further an adjust screw to adjust the position of said screw shaft minutely in the thrust direction.

3. A disk recording-reproducing device as set forth in claim 1, wherein said groove portions are displaced successively circumferentially $2\pi/8$ radian and axially $\frac{1}{8}$ pitch.

4. A disk recording-reproducing device as set forth in claim 1, wherein said polygonal prism portion is used as a rotation position detecting means for said screw shaft.

* * * * *